United States Patent [19]

Mellina et al.

[11] 4,304,668
[45] Dec. 8, 1981

[54] FLOATING APPARATUS FOR RECOVERY OF FLOATING OIL

[76] Inventors: Serge P. Mellina, Bourg de Sevel; Guy Mascarin, 27, Résidence Corlay, both of Lannion, France, F-22300

[21] Appl. No.: 150,438

[22] Filed: May 16, 1980

[30] Foreign Application Priority Data

May 16, 1979 [FR] France .............................. 79 12928

[51] Int. Cl.³ ............................................ E02B 15/04
[52] U.S. Cl. .................................. 210/242.3; 210/923
[58] Field of Search ................ 210/83, 242, DIG. 25, 210/800

[56] References Cited

U.S. PATENT DOCUMENTS

| | | | |
|---|---|---|---|
| 3,219,190 | 11/1965 | Thune | 210/242 |
| 3,623,609 | 11/1971 | Ainlay | 210/242 |
| 3,656,624 | 4/1972 | Walton | 210/242 |
| 3,700,107 | 10/1972 | Flaviani | 210/242 |
| 3,731,813 | 5/1972 | Tipton | 210/DIG. 25 |
| 3,785,496 | 1/1974 | Smith, Jr. | 210/DIG. 25 |
| 4,049,554 | 9/1977 | Ayers | 210/DIG. 25 |

Primary Examiner—Theodore A. Granger
Attorney, Agent, or Firm—Alter and Weiss

[57] ABSTRACT

The invention describes a device for recovering oil floating on the surface of water. The device is a floating vessel which is maneuverable at will in order effectively to recover all of an oil slick floating on the surface of the water. The device includes paddle wheel means to skim the oil from the surface of the water. The oil so picked up is propelled up guide plates, and over weirs, with a plurality of said wheels being arranged in sequence. The wheels are of different diameter but rotate at the same speed in order to provide separation of oil and water picked up by the device, and the device is also arranged to discharge the oil into a means from which the oil can readily be transported away from the device.

The device may be provided with an additional wheel and screen for picking up debris floating on the surface of the water, and to separate that debris from the oil and water picked up by the device by leaving it on the screen.

5 Claims, 9 Drawing Figures

FLOATING APPARATUS FOR RECOVERY OF FLOATING OIL

This invention relates to a floating device for the recovery of oil floating on the surface of the water.

Among the devices already known for the recovery of oil on the surface of the sea, one is a device consisting of a continuous belt fitted with rubber flaps, with the continuous belt placed at such an angle that the flaps come into contact with the water and lap up the oil on the surface. There is also a device of the centrifuge or separator type. Equipment has also been devised in the United States designed to attempt to recover oil out at sea, and which is drawn along by means of two ships and forms a v-shaped barrier which collects the oil at the base of the V. The thickness of the barrier increases in relation to the speed of the ships. The oil trapped at the base of the V is then pumped out.

These already known devices are difficult to use in shallow water because of the draught required for the auxiliary boats which provide them with the power necessary for them to operate or which draw them along. Except out at sea the swell or the waves rapidly reduce the efficiency of these devices.

One aim of the invention under consideration lies in providing a floating device for recovering oil which can be used near the shore, for example at a distance somewhere between 0 and 100 meters, or more if the state of the sea permits.

Another aim of this invention lies in providing a device which is very easy to handle so that it may be used with men who are not highly trained, and in consequence so that its use may be spread without difficulty.

Another aim is to provide such a device at a reasonable cost, since it does not involve any highly elaborate equipment, thus enabling potential users, i.e. French 'parishes' which border on the sea, to obtain a reasonable number so that immediate action may be taken to avoid pollution.

Another aim is to provide a means of avoiding entry into the recovery device itself of solid matter, such as seaweed, pieces of wood etc. which might obstruct the operation of the device.

Another aim is to provide a means of regulating the angle of attack of the device itself according to the state of the sea and the thickness of the layer of oil, and also a means of regulating the angle of attack of the equipment designed to avoid the intrusion of foreign bodies in the apparatus.

In accordance with one feature of the invention, a floating device for recovering oil floating on the surface of the water is planned, consisting of two side plates and a base plate situated slightly below the surface of the oil-water mixture, with a front wheel with transverse paddles which make the scraped mixture rise above the base plate along a first section in an 80° arc approximately, in which there is also to be a rear wheel with transverse paddles of smaller diameter than the front wheel, and which is driven practically at the same angular velocity as the front wheel, the axis of the rear wheel being higher than that of the front wheel with its paddles taking up the mixture at the high point of the first section to push it onto a second section in an arc which is almost symmetrical, the front point of which is adjacent to the high point of the first section and the back point of which is a little higher than the said front point, towards a separating tank, the paddles of the front and back wheels being a little less long than the widths of the first and second sections respectively.

In accordance with another feature, the device includes, behind the front and back wheel, which form a first pair, a second pair of wheels with transverse paddles, in conjunction with similar sections, the front wheel of the second pair dipping into the separation tank situated behind the first pair to carry the mixture along towards a reservoir.

In accordance with another feature, between the back point of the second section of the first or second pair of wheels and the separation tank or the reservoir, a ramp to take the mixture down is planned, which includes cross baffles mounted above the bottom of the ramp, with holes being placed in the side rims of the ramp, above the low level of the baffles.

In accordance with another design detail, it is planned to have, in front of the entrance to the recovery equipment itself, a paddle wheel of relatively large diameter, behind which is mounted a lattice ramp extended by a collector, also latticed, the ramp being mainly below the level of the water and the wheel causing any solid objects appearing at the front of the device to move up along the ramp to the collector.

In accordance with another feature, the said paddle wheel, the ramp and the collector are mounted on a frame extended at the back beyond the recovery device itself, the back portion of the frame supporting a counterweight which may be provided by the motor for the device, the frame being pivoted around a horizontal axis carried by the chassis, fitted with floats, which carries the device and the said frame.

In accordance with another feature, the device itself is pivoted around a second horizontal axis carried by the said chassis.

The design feature referred to above, as well as others, will appear more clearly when the following description of an example of operation has been read, the said description being given in conjunction with the attached drawings, which are as follows.

Firstly the elements of the device directly involved in the recovery of the oil will be described, with reference to FIGS. 1 and 2, and assuming the device to be held by floats in the position indicated in FIG. 1 in relation to the water level.

These active elements comprise two parallel vertical side plates 1 and a base plate 2 forming a U-shaped box. Between the two side plates 1, are mounted, by means of adequate bearings, two stages of two paddle wheels 3 and 4, and 5 and 6. The paddle wheels 3 to 6 are driven in the direction indicated by the arrows, from a motor not visible in FIGS. 1 and 2, but visible 7, in FIG. 3. The paddle wheels obviously have horizontal axes of rotation. Paddle wheels 3 to 5 each consist of six paddles with angular separation of 60°, and wheel 6 has eight paddles.

From the lowest point of the circle described by the ends of the paddles of wheels 3, including the scrapers 8, and covering an arc of about 80°, in the direction of rotation, is a steel plate 9 with a cylindrical section, and with its ends fastened to side plates 1. On both sides of the lowest point of the circle described by the ends of the paddles of wheels 4, namely at symmetrical angles of about 40° in relation to this low point, is a steel plate 10 with cylindrical section, with its ends fastened to side plates 1. Plates 9 and 10 are connected by plate 11, with cylindrical section of small radius of curvature. The right hand end 12 of plate 10 is connected to the base plate 2 by plate 13.

From the lowest point of the circle described by the ends of the paddles of wheel 5, and for an arc of about 80°, in the direction of rotation, is plate 14 with its ends fastened to side plates 1. On both sides of the lowest point of the circle described by the ends of the paddles of wheel 6, with a section similar to that of plate 10, is plate 15, its ends fastened to side plates 1. Plates 14 and 15 are joined by plate 16 with a cylindrical section of low radius of curvature. The left hand end 17 of plate 15 is connected to base plate 2 by plate 18. Plates 13 and 18 and base plate 2 form, with the adjacent portions of side plates 1, a separating tank between the two stages.

In the first stage of the two wheels 3 and 4, the paddles of wheel 3 are appreciably longer than those of wheel 4. Similarly in the second stage, the paddles of wheel 5 are appreciably longer than those of wheel 6.

None of the paddles of wheels 4 and 5 are fitted with scrapers, such as 8. However, wheel 6, which preferably carries eight paddles, instead of six, equally spaced, has all blades fitted with scrapers 19. All the wheels have the same angular velocity.

Figure 2:
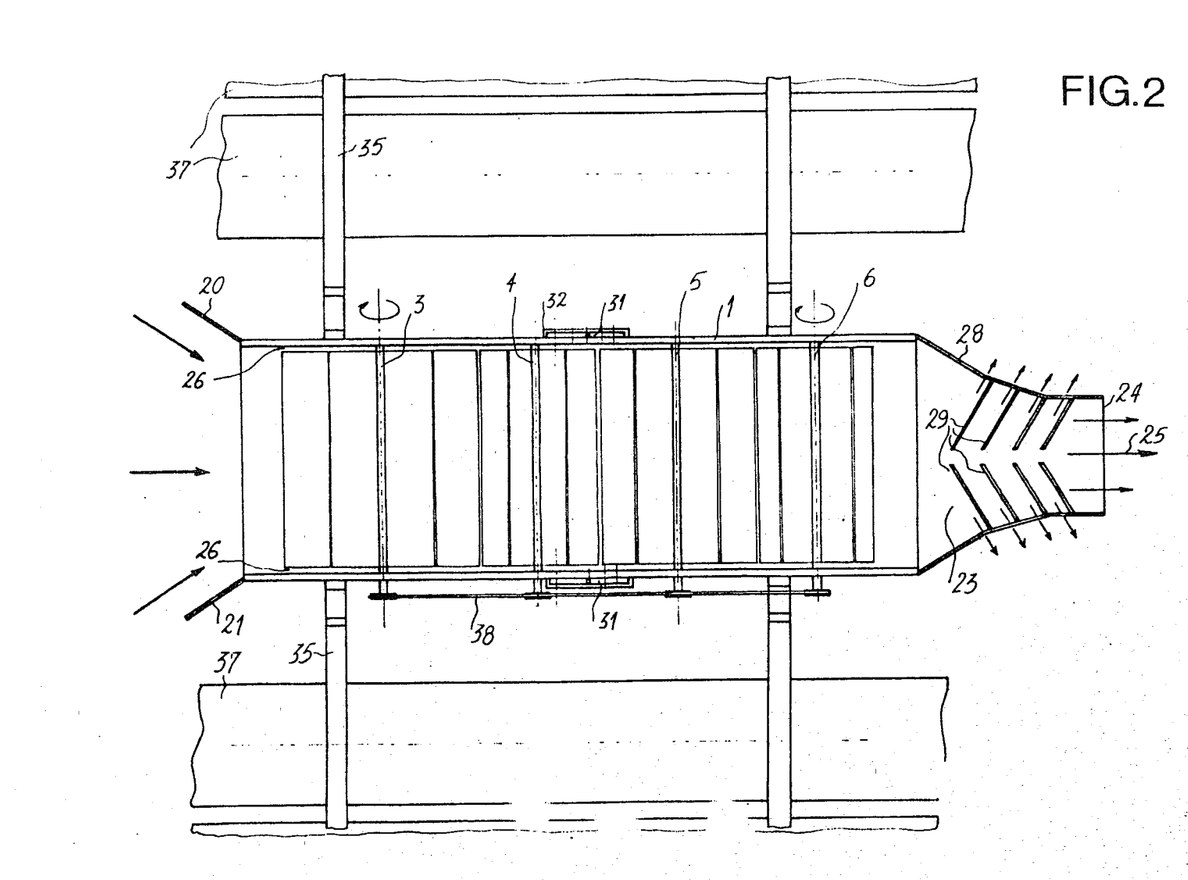
FIG. 2 is a plan elevation of the device in FIG. 1.

In front of plate 9 are vertical deflectors 20 and 21, FIG. 2 acting as an open funnel in the direction of travel to concentrate the oil into the apparatus as it moves along. Behind point 22 on the right hand end of plate 15, plate 23 has a relatively shallow slope towards the rear of the device, plate 23 acting as an exit spout for the oil, ending at point 24, beyond which the oil 25 is channelled into a floating reservoir from which it may be pumped.

Figure 4:
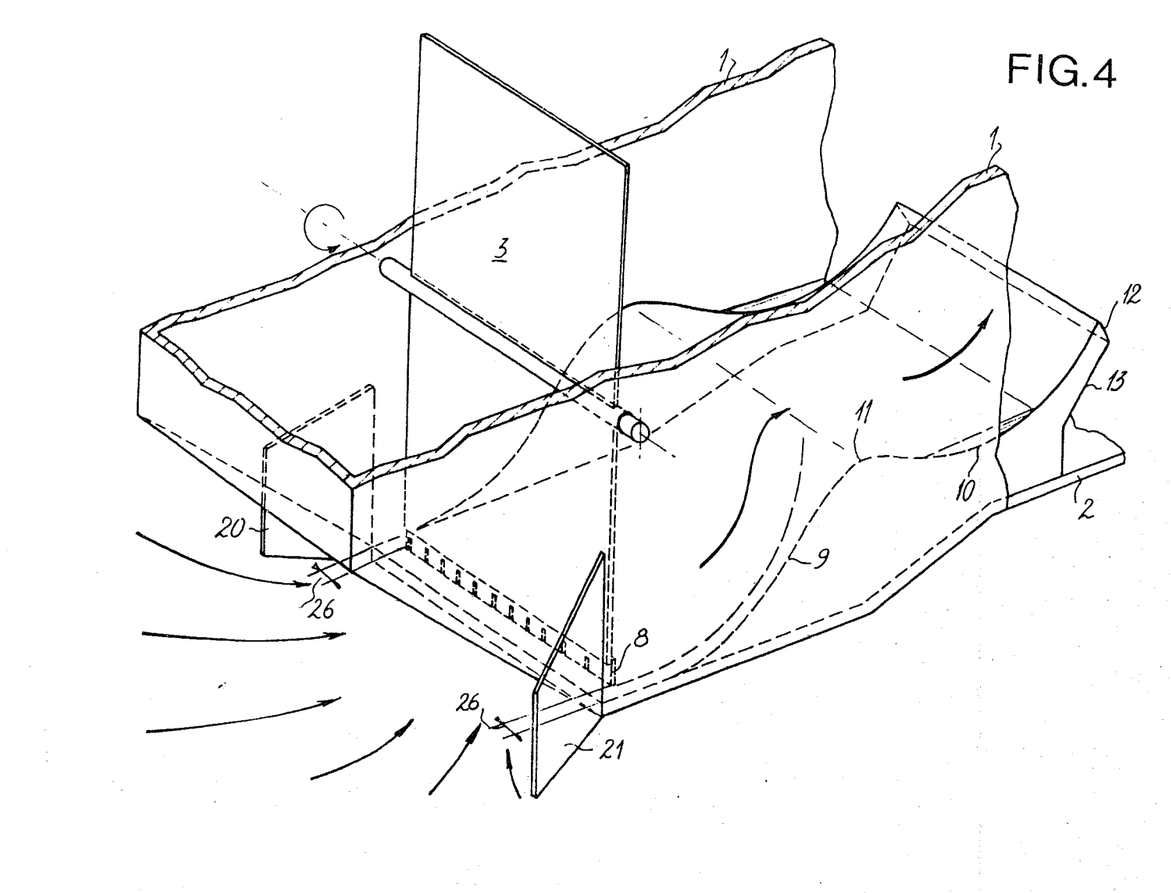
FIG. 4 is a perspective drawing of the front portion of the device in FIG. 1, cut away to illustrate how the device operates.

It should also be noted that the paddles of all the wheels 3 to 6 are shorter than the space between the side plates 1, so as to allow spaces 26 on each side, the purpose of which will be seen later, these spaces being easiest to see in FIGS. 2 and 4. Also it is preferable for point 12 to be higher than point 11 on plate 10 and point 22 to be higher than point 16 on plate 15. Further, plates 13 and 18 are sloped to descend towards the front of the device in order that the oil, mixed with water, which they contain has no movement due to pitching of the vessel, or at least in order that these motions are minimized. In the sides of the reservoir formed by plates 13 and 18, in the side plates 1, are to be openings 27, in this example two on each side, which are situated a certain height above base plate 2 and which may be more or less covered by valves 31, visible in FIGS. 2 and 5.

It should also be noted that between plate 10 and the ends of the paddles of wheel 4, a certain space is allowed, and similarly between plate 14 and the ends of the paddles of wheel 5. In contrast, when rotating, the ends of the scrapers 8 rub against plate 9 almost to the end of the latter, and the ends of scrapers 19 rub against plate 15.

Figure 6:
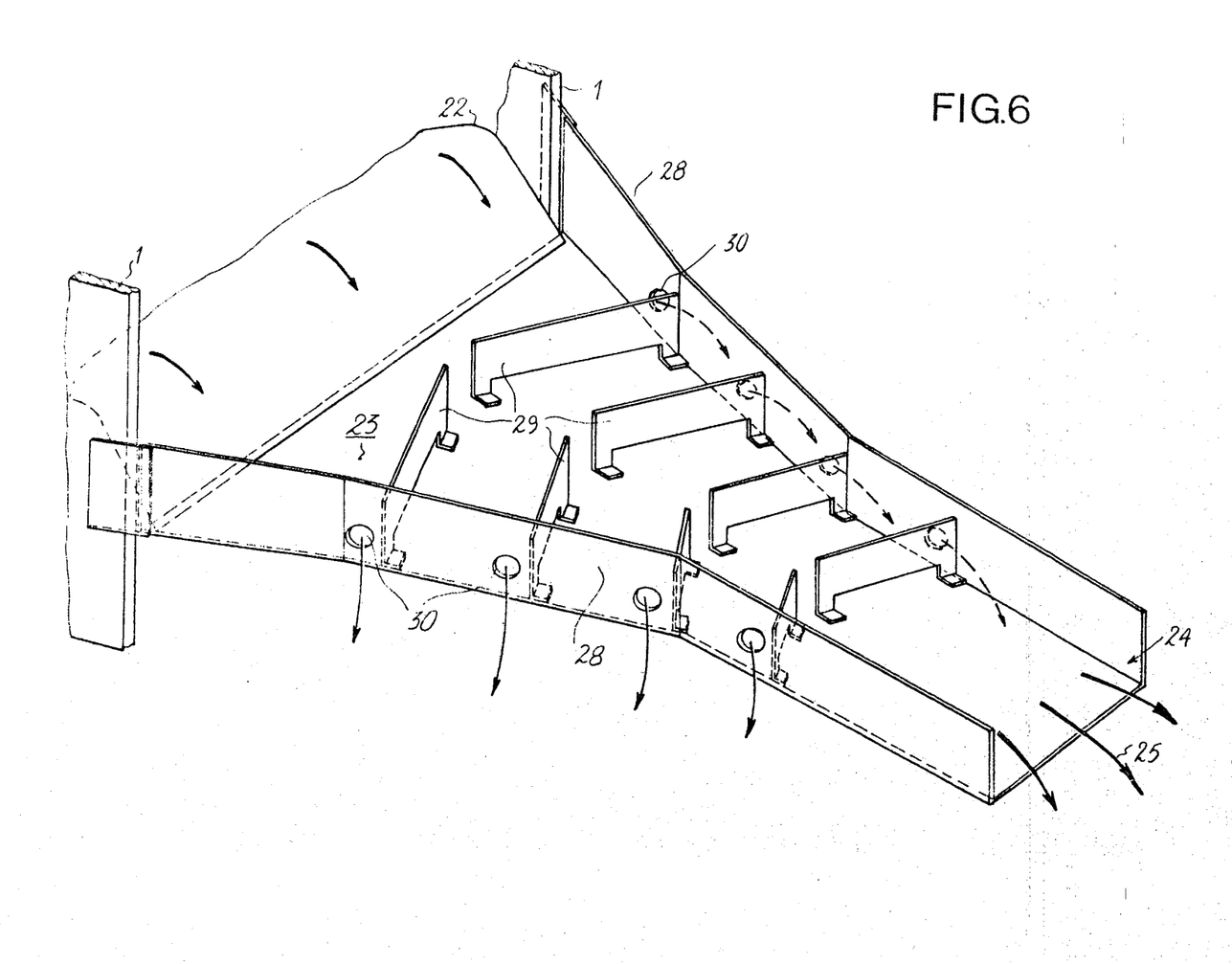
FIG. 6 is a perspective drawing of the rear part of the device in FIG. 1, illustrating the operation of this part of the device.

As shown in FIG. 6, there are to be vertical flanges 28 on plate 23 to guide the oil descending towards the rear. In addition, baffles 29 are mounted above the base plate 23 of the exit funnel to deflect the upper layer of the flow, which escapes through holes 30 in flanges 28.

Figure 5:
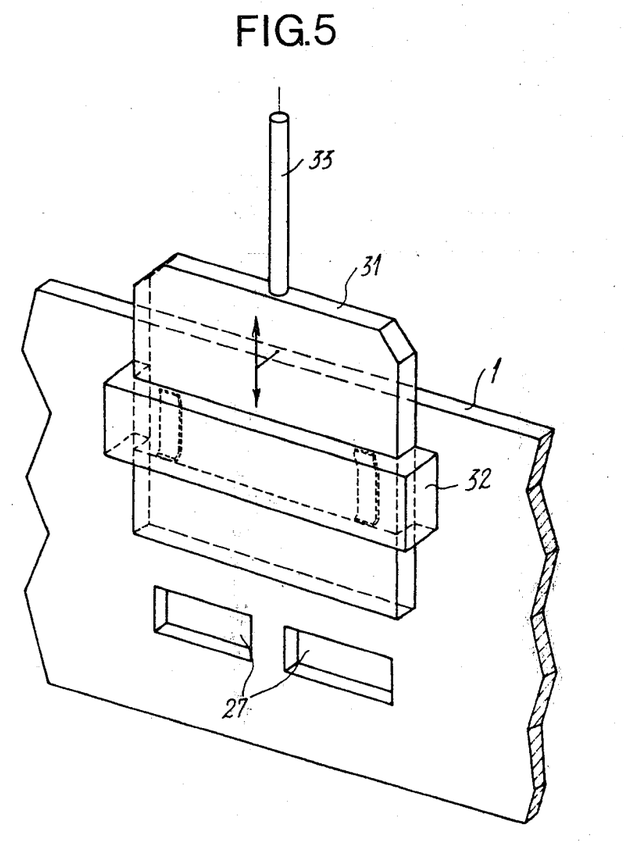
FIG. 5 shows a regulating valve used in the device in FIG. 1.

The valves 31 are mounted on the outside of side plates 1 against which they are held by slides 32 in which they can slide vertically. They are hung from shafts 33, the heights of which can be adjusted by means not shown here, in order to regulate the effective size of openings 27.

We will now describe the operation of the device in accordance with the invention. Assume that the front edge of base plate 2 is about 5 cm. below the level of the open surface of the oil. By rotating wheel 3, the scrapers 8 and the ends of the paddles without scrapers force the oil and the oil-water mixture up the length of plate 9. At the top of plate 9, i.e. practically at point 11, the distance between the end of one scraper 8 and the plate should preferably be about 1.5 cm. The speed of rotation of wheel 3 is, for example, about 25 to 30 revs/minute. During the ascent on plate 9 by the oil-water mixture, there is a first separation between the water and the oil, which is due to the difference in viscosity between the two liquids. Indeed, the water, more fluid, passes above the oil, although the latter is lighter, and tends to fall back towards the front of the device on both sides of the paddles by way of the spaces 26 designed for this purpose. The paddles of wheel 3, which are not fitted with scrapers, aid this removal of water to the sides.

The oil is recovered from the peak 11 of 9 by the second wheel 4 which has shorter paddles than those of wheel 3. As a guide, the paddles of wheel 4 might be 15 cm. long while those of 3 would have a length of 25 cm. Plate 10 is about 1 cm. from the ends of the paddles. It is readily apparent therefore that the tangential velocity of the ends of the paddles of 4 is distinctly lower than that of the ends of the paddles of 3, due to the angular velocities of the wheels being equal. Consequently, this produces at the level of point 11 a choking up caused by the braking due to wheel 4. This choking up aids the concentration of oil at this point and, thus, separation from the water which escapes through spaces 26.

The oil entrained by the paddles of 4 along section 10 is discharged into the separating reservoir formed by plates 13 and 18, as mentioned above. Moreover, since point 12 is a little higher than point 11, plate 10 also serves to separate by viscosity as does plate 9, the water escaping through spaces 26 on both sides of the paddles of 4.

The separation tank 13-18 may have a capacity of about 40 liters. In this reservoir, the separation of oil and water is produced by the difference in density. The water falls to the bottom while the oil rises. The openings 27 have their upper edge level controlled by the vales 31 so as to be below the plane of separation of the oil and water, but the level of the lower edge of these openings must of course be set above the water-line.

Wheel 5, with paddles about 20 cm. long, takes the oil from the top of the reservoir, into which the paddles dip about 5 cm., and pass it up the length of plate 14 up to point 16 where the distances from the paddles is about 1 cm.

The oil is collected at the peak 16 by the fourth wheel 6 which has paddles about 15 cm. long. This results in another choking up at the level of point 16 with a resulting return of water towards the reservoir through spaces 26, as at point 11, and an accumulation of oil on the face of plate 15. Since wheel 6 has all its paddles fitted with scrapers 19, these draw all the oil from 15 along towards funnel 23.

In funnel 23, the liquid gains speed in descending towards point 24. The result of this is that due to the difference in viscosity the remaining water once again passes over the oil and forms a superficial layer which is checked, in its descent, by baffles 29 which direct it towards the holes 30 through which it is returned to the sea. The oil passes under the baffles to be delivered into a floating reservoir below 25.

Figure 3:
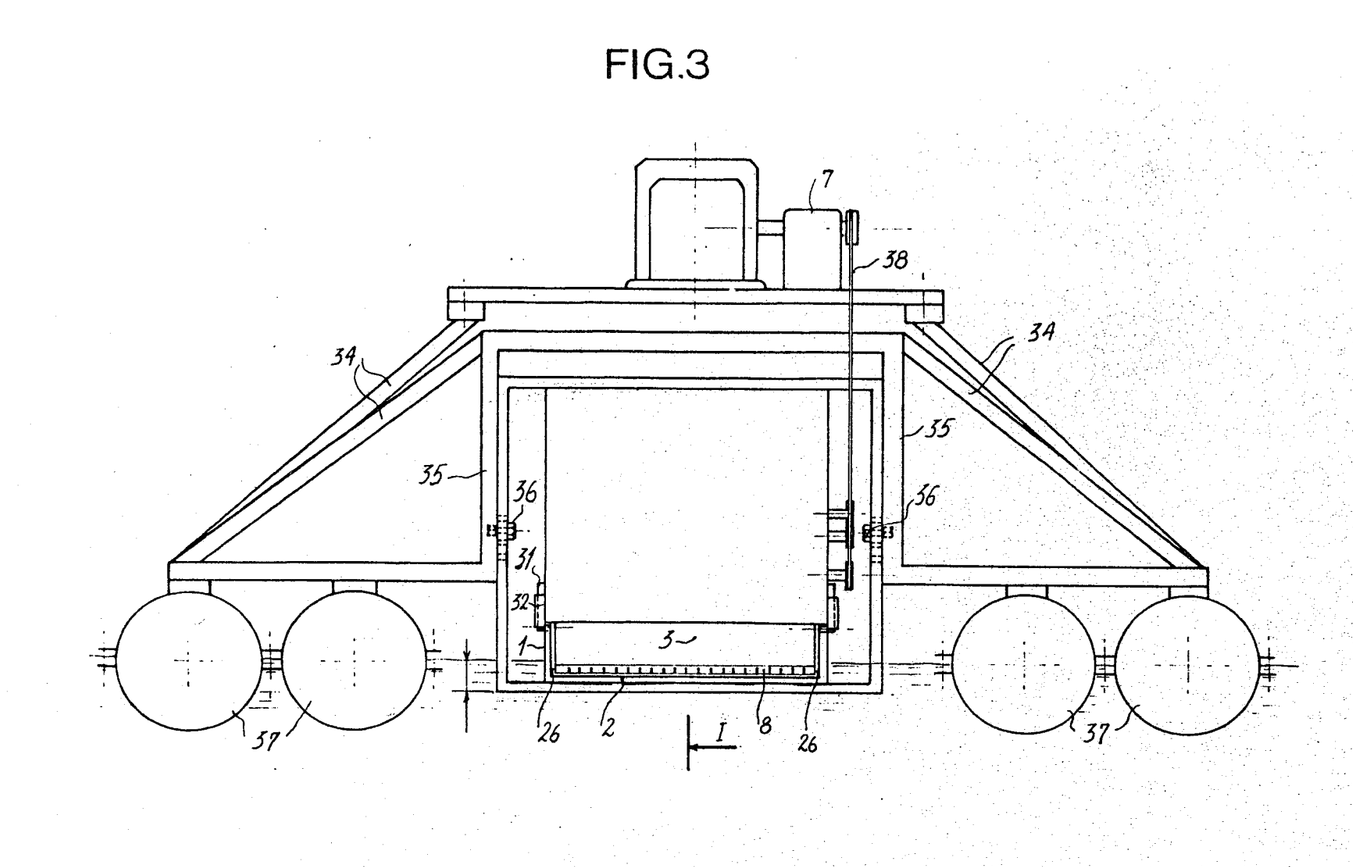
FIG. 3 is a front elevation of the device in FIG. 1.

FIG. 3 shows how the structure which has just been described is carried by yokes 34 mounted on a chassis 35, by means of fasteners 36 allowing adjustment of height. The chassis 35 is carried on floats 37.

On chassis 35 is mounted the motor 7 which drives the wheels 3 to 6 by means of chains 38, represented symbolically. The chassis and, thus, the device as a whole, is maneuverable by means of a motor and rudder, such as an out-board type, and the draught need be no more than 20 to 25 cm., permitting use of the device very close in to beaches.

Regarding materials used, the side plates 1 and the base plate 2 may be in marine ply while the chassis 35 may be constructed as a welded frame. As a guide, the dimensions of the device might be 3.20 m. long by 2.5 m. wide, with a weight of the order of 500 kg.

It will again be noted that the axle of wheel 4 is at a higher level than that of wheel 3, this arrangement also applying in the second stage with wheels 5 and 6.

Among the principal features of the invention, we are withholding:

the relative diameters of paddle wheels 3 and 4, and 5 and 6, the relative positions of their axes, which lead to the creation of the backing up at points 11 and 16;

the slopes of plates 9 and 14 which cause a separation by viscosity differential and the shapes of sections 10 and 15 which cause a separation by density differential;

the slope of section 23 with its baffles which causes a separation by viscosity differential.

In addition, there can be eight vertical slots 39 to 42, open at the top and with semi-circular bottoms to take respectively the axle bearings of paddle wheels 3 to 6. These allow very rapid mounting and demounting of the wheels. In practice, the axles of the paddle wheels are mounted with ball bearings resting in two half-shells.

Figure 1:
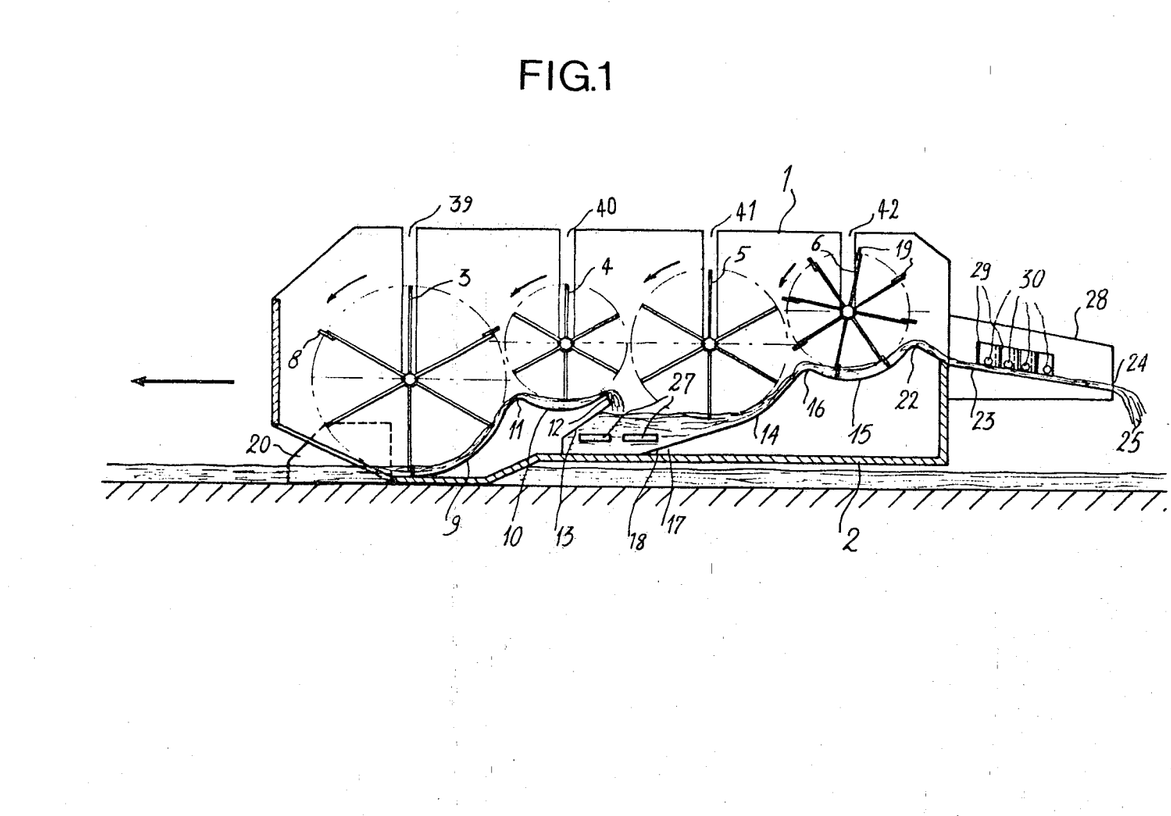
FIG. 1 is a schematic longitudinal section of the device described.
Figure 7:
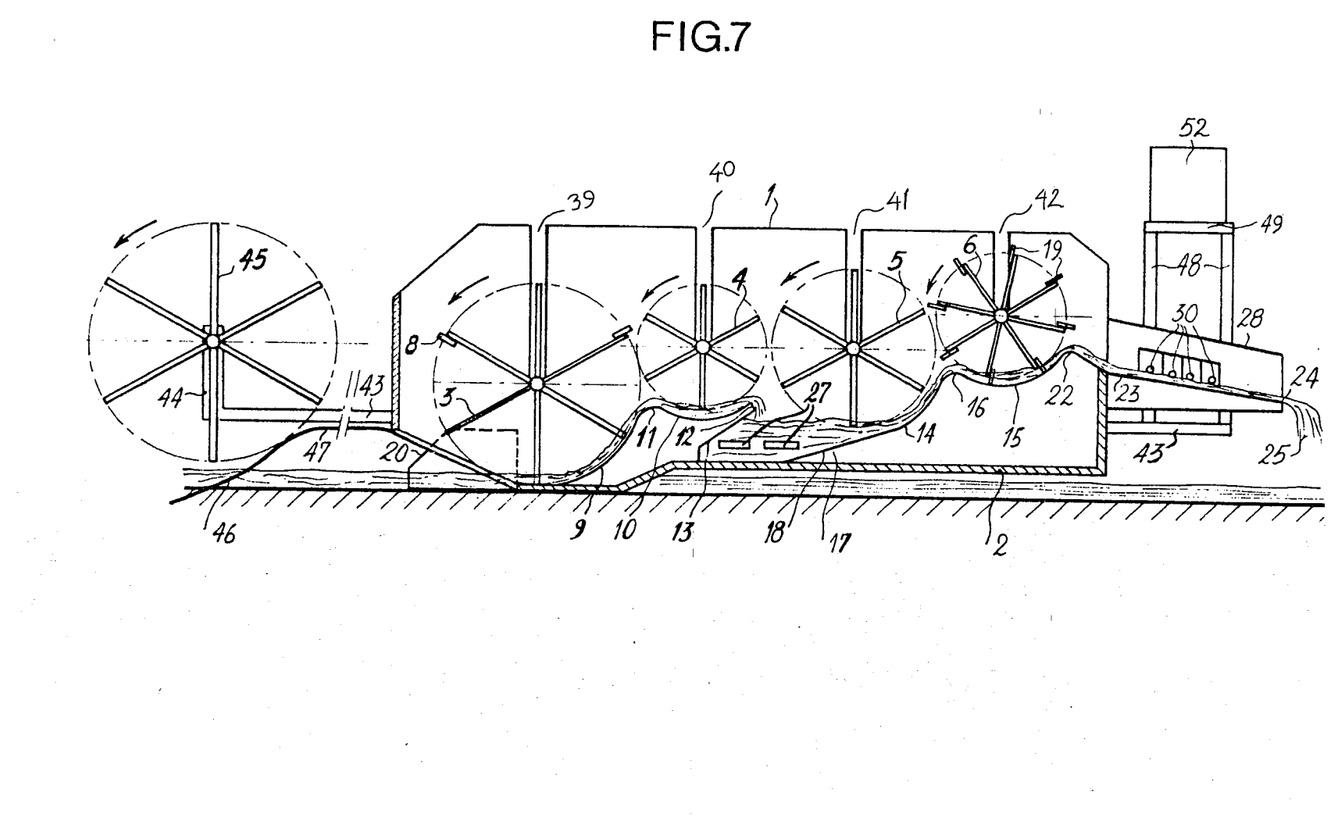
FIG. 7 is a longitudinal section of the device described, with its protective paddle wheel at the front.
Figure 8:
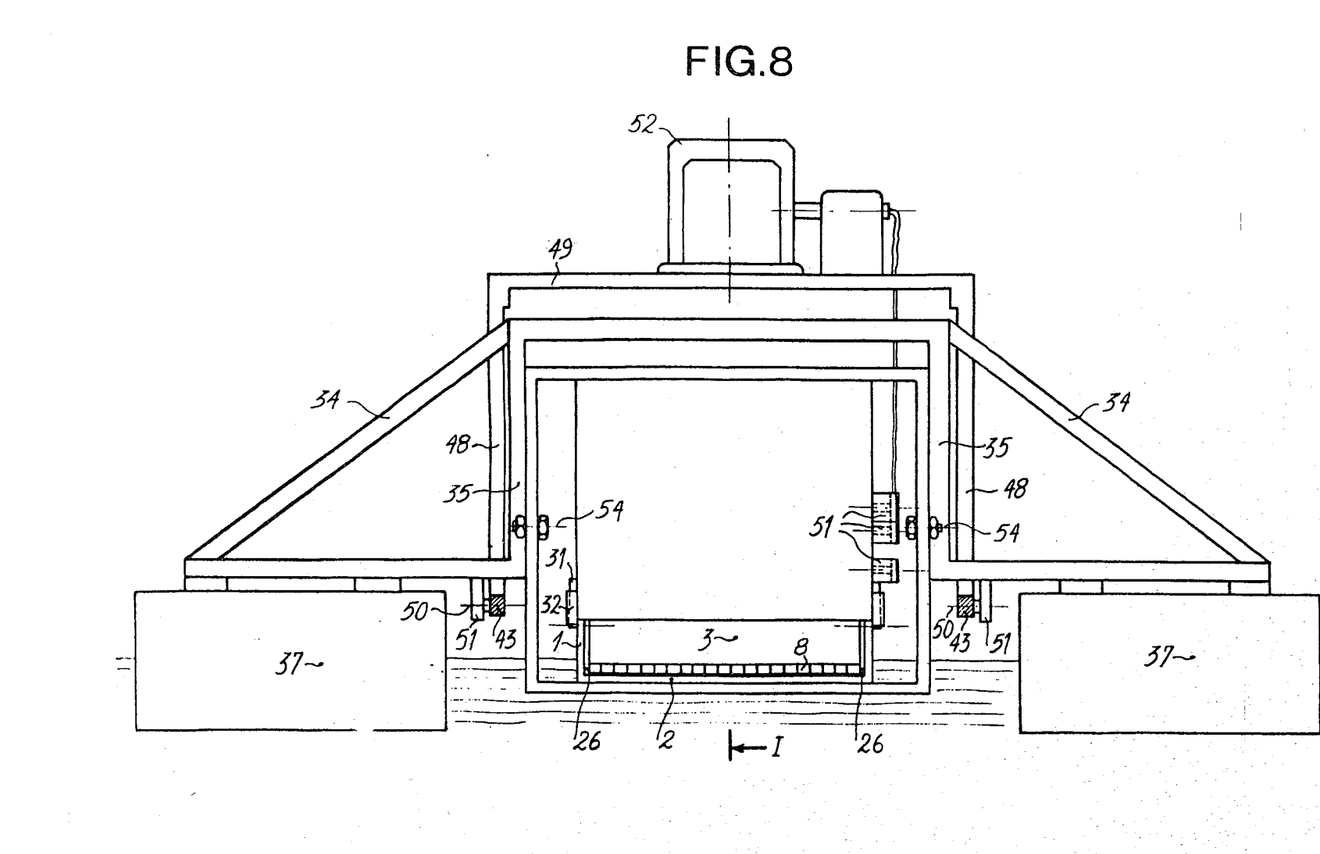
FIG. 8 is a front elevation, the front protective wheel and its accessories being omitted, of the device shown in FIG. 7.

In FIG. 7 are shown the components of the device shown in FIG. 1, i.e. one of the two side plates 1, the base plate 2, two stages of paddle wheels 3 and 4, 5 and 6, a series of plates 9, 10, 11, 13, 14, 15, 18 and 23.

In front of the front wheel 3 is mounted, on a frame 43, at the end of a vertical arm 44, a paddle wheel 45. Below wheel 45, a lattice grill 46 dips, which rises front to rear up to a horizontal grill 47, also made of lattice. The edges of grills 46 and 47 are obviously maintained rigid by frameworks, not shown, which are integral with frame 43. The lower edge of 46 drops sufficiently below the level of the sea, covered with oil, to skim it and gather up floating objects, such as pieces of wood, bottles and clumps of seaweed. Due to the movement of the floating device, these objects tend to climb up along 46 and are taken along by the paddles of wheel 45 which turns in the direction indicated by the arrow and which pushes them on to grill 47, where they remain. Since 46 and 47 are lattice work, the water and oil accompanying these objects can fall back through them. Of course, in place of lattice, one can use perforated plates etc. The distance between the rear of wheel 45 and the front of the recovery device itself, which corresponds to the length of grill 47, is intended to be large enough to hold a good quantity of objects. Grill 47 may be provided with an opening under which is hung a basket to allow an increase in the storage capacity for these recovered objects.

Frame 43 comprises in practice two side-members, of which one is visible in FIG. 7, which extend beyond the rear of side plates 1, where they carry, by means of vertical arms 48, a platform 49. The platform 49 is designed to support a counterweight. The whole of frame 43 is mounted on a horizontal pivot 50, carried on support 51, integral with chassis 35, which is mounted on floats 37. Preferably, in this operating example, the counterweight is provided by a hydraulic power unit 52 which feeds, by means of suitable piping, the hydraulic motors 53 mounted directly on the ends of the axles of the paddle wheels.

Thus, the whole of frame 43, carrying wheel 45 on one end and the hydraulic unit 52 on the other, can oscillate about pivot 50. Since this system is balanced, one may easily, by means of a lever, shown as 54 in FIG. 9, vary the inclination, namely in practice lower or raise wheel 45 in relation to the level of the water. This ability to vary it is useful in the event of swell to prevent the water entering into the recovery device.

In a similar fashion, the whole of the side plates 1, which constitute the framework of the recovery device, is mounted free to swing on a pivot 55 carried on cassis 35. A lever 56 allows alteration of the inclination of the device, i.e. the depth of the front edge of plate 9 in the water. This ability to regulate enables the depth to be adjusted in accordance with the thickness of the layer of oil.

Figure 9:
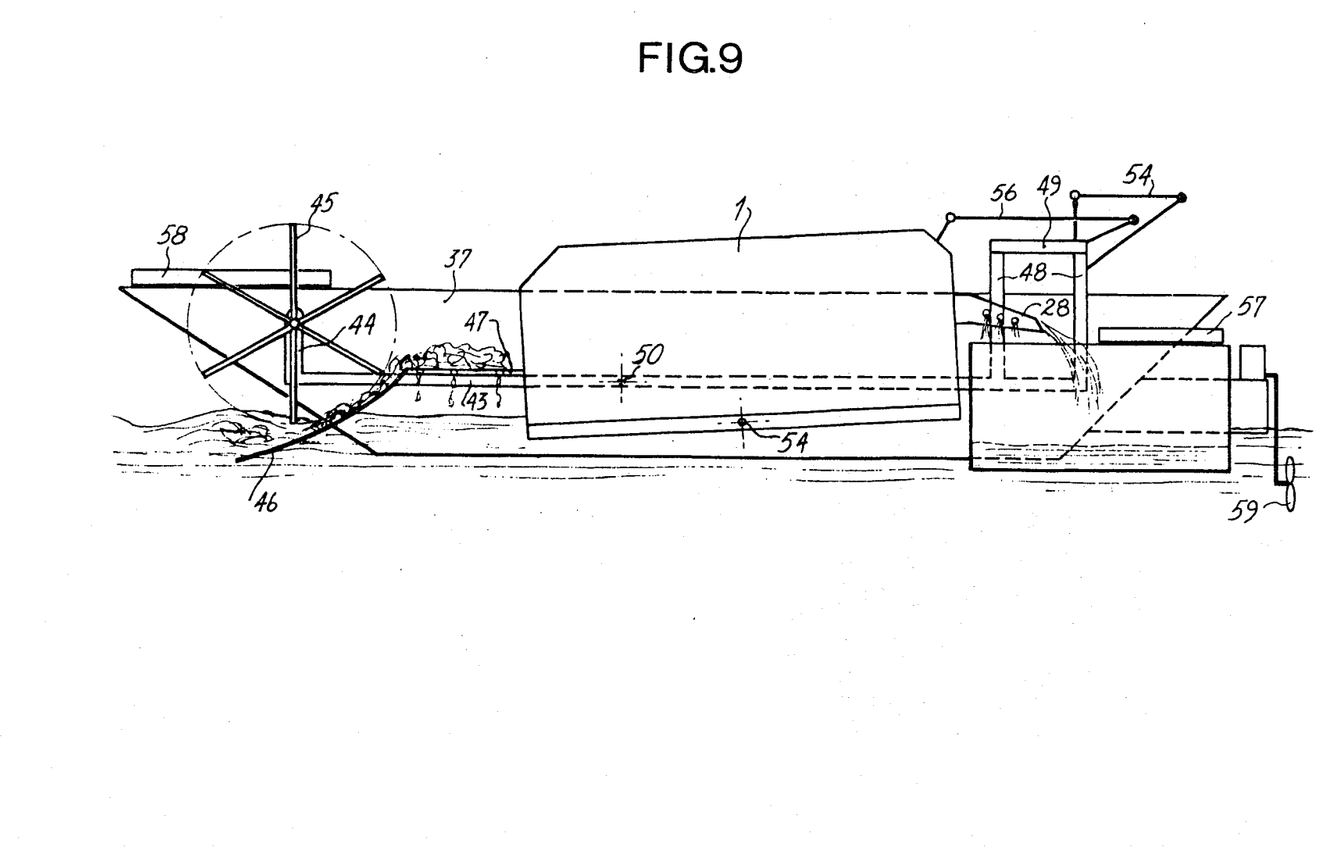
FIG. 9 is a side elevation showing the pivots of the device and of the front protective wheel.

In FIG. 9 the drawing of the device shows how an operator, positioned on a platform 57, mounted on the chassis, may, with the aid of levers 54 and 56, manoeuvre wheel 45 and the device to ensure the optimum recovery of the oil and minimize the effect of the swell.

In a practical version of the device, the floats 37 are streamlined and each carries a bridge 58, FIG. 9. At the rear of each float is an outboard motor or a hydraulic motor powering a propellor 59, which is preferably controlled from the front of the float where a helmsman can see the slicks of oil to be removed.

In the final recovery of the oil, one can use a flexible pipe several hundreds of meters long which allows discharge of the oil either into tank barges or into tanker lorries positioned close to the waterside.

The recovery device may also be used to recover pollutants other than oil, for example, floating objects, by replacing the paddles with brushes.

Moreover, given the easy dismantling of the wheels and the modest dimensions of the device, it is easily transportable dismantles and may thus find use, not only on the sea, but also on rivers, lakes, etc.

We claim:

1. A device for the recovery of oil floating on the surface of a body of water, said device comprising:
  a pair of side plates;

a base plate positionable slightly below the surface of the interface of said oil and said water mixture,
said base plate disposed between said side plates;
a first wheel with transverse paddles rotatably mounted upon a first axle;
said axle supported by said side plates;
a first plate,
said first plate positioned beneath said first wheel and extending rearward therefrom,
said first wheel paddles drawing said oil and said water above said base plate, about an eighty degree arc along said first plate;
a second wheel with transverse paddles,
said second wheel rotatably mounted upon a second axle,
said second axle supported by said side plates behind and above said first axle,
said second wheel having a smaller diameter than said first wheel;
a second plate joined to said first plate and extending downstream of said first wheel and proximate to and extending beneath said second wheel,
said paddles of second wheel contacting said oil and said water at the front point of said second plate thereby drawing said oil and said water rearward along said second plate;
a separating tank,
said separating tank positioned beneath the termination of said second plate,
said separating tank receiving and holding said oil-and-water mixture drawn along said second plate by said second wheel,
a third wheel with transverse paddles,
said third wheel rotatably mounted upon a third axle,
said third axle supported by said side plates,
said third wheel positioned downstream of said second wheel;
a third plate,
said third plate extending into said separating tank and rearward therefrom beneath and proximate to said third wheel,
said third wheel paddles dipping into said separating tank and drawing said oil-and-water mixture along said third plate about a fifty degree arc;
a fourth wheel with transverse scrapers,
said fourth wheel rotatably mounted upon a fourth axle,
said fourth axle supported by said side plates,
said fourth wheel positioned downstream of said third wheel, behind and above said third wheel axle,
said fourth wheel having a smaller diameter than said third wheel;
a fourth plate,
said fourth plate joined to said third plate and extending downstream of said third plate and proximate said fourth wheel;
a ramp;
said ramp having a pair of vertical ramp side plates and a generally horizontal ramp base plate positioned therebetween downstream of said fourth plate,
said fourth wheel scrapers scraping said mixture from said fourth plate toward said ramp; and
a reservoir collecting said oil flowing off said ramp.

2. The invention according to claim 1 in which said ramp includes:
a multiplicity of cross baffles mounted at equal intervals along said ramp base plate, and horizontally angled with respect to said ramp base plate,
said ramp side plates having a multiplicity of holes positioned above said ramp base and proximate to each said baffle.

3. Device as in one of claim 1, characterized in that, in front of the entrance to the recovery device itself, there will be a paddle wheel of relatively large diameter, behind which is mounted a lattice ramp extended by a collector, also latticed, the ramp running mainly below the water level and the wheel making any solid objects arriving in front of the device travel up along the ramp to the collector.

4. Device as in claim 3, characterized in that the said paddle wheel, the ramp and the collector are mounted on a frame extended at the rear beyond the recovery device itself, the rear portion of the frame supporting a counterweight which may be provided by the motor for the device, the frame being pivoted around a horizontal axis carried by the chassis, fitted with floats, which carries the device and the said frame.

5. Device as in claim 4, characterized in that the device itself is pivoted around a second horizontal axis supported by the said chassis.

* * * * *